(12) United States Patent
Cuddihy et al.

(10) Patent No.: US 10,788,122 B2
(45) Date of Patent: Sep. 29, 2020

(54) TRANSMISSION CONTROL WITH OCCUPANT DETECTION

(71) Applicant: Ford Global Technologies, LLC, Dearborn, MI (US)

(72) Inventors: Mark A. Cuddihy, New Boston, MI (US); William M. Gardner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 204 days.

(21) Appl. No.: 15/935,514

(22) Filed: Mar. 26, 2018

(65) Prior Publication Data
US 2019/0293171 A1    Sep. 26, 2019

(51) Int. Cl.
F16H 61/02 (2006.01)
F16H 59/44 (2006.01)

(52) U.S. Cl.
CPC ......... *F16H 61/0204* (2013.01); *F16H 59/44* (2013.01)

(58) Field of Classification Search
None
See application file for complete search history.

(56) References Cited

U.S. PATENT DOCUMENTS

| 6,331,014 B1* | 12/2001 | Breed | B60R 21/207 280/730.1 |
|---|---|---|---|
| 8,651,589 B2 | 2/2014 | Ishikawa et al. | |
| 9,114,704 B2 | 8/2015 | Hermann | |
| 9,994,125 B2* | 6/2018 | Magana | B60N 2/90 |
| 2003/0221922 A1 | 12/2003 | Callow | |
| 2006/0208169 A1* | 9/2006 | Breed | B60N 2/002 250/221 |
| 2013/0207773 A1* | 8/2013 | Hathaway | B60K 28/12 340/3.43 |
| 2014/0229092 A1* | 8/2014 | Hermann | B60K 23/00 701/116 |
| 2015/0344004 A1* | 12/2015 | Al-Regib | B60T 1/062 701/51 |
| 2016/0146335 A1* | 5/2016 | McGuire | F16H 59/105 701/51 |
| 2017/0203640 A1* | 7/2017 | Rafeld | B60J 5/0476 |

FOREIGN PATENT DOCUMENTS

| EP | 2072359 A1 | 6/2009 |
|---|---|---|
| JP | 11165618 A | 6/1999 |
| JP | 2005313819 A | 11/2005 |
| WO | 2017077282 A1 | 5/2017 |

* cited by examiner

*Primary Examiner* — Justin Holmes
(74) *Attorney, Agent, or Firm* — Frank A. MacKenzie; Bejin Bieneman PLC

(57) ABSTRACT

A computer in a vehicle includes a processor and a memory storing processor-executable instructions. The processor is programmed to shift a transmission of the vehicle from a gear into park upon receiving a first signal from a first active sensor beyond a signal threshold and then, within a time threshold, receiving a second signal from a second active sensor beyond the signal threshold. The signals are correlated with distances from the respective active sensor to a detected object.

16 Claims, 4 Drawing Sheets

TRANSMISSION CONTROL WITH OCCUPANT DETECTION

BACKGROUND

Vehicles often have an "automatic park" feature. This feature monitors whether a driver of the vehicle exits the vehicle, and if so, a transmission of the vehicle shifts into park. The purpose of the conventional automatic-park feature is to prevent the vehicle from rolling while the occupant exits the vehicle and to prevent the vehicle from rolling away after the occupant exits the vehicle. A first type of conventional automatic-park feature detects whether a driver door of the vehicle opens. The first type requires that the vehicle have doors in order to detect whether the driver door is open; thus, this conventional automatic-park feature is not suitable for vehicles without doors or with removable doors. A second type of conventional automatic-park feature monitors whether a weight sensor in a driver seat detects that the seat is empty. Detecting earlier that an occupant intends to exit the vehicle would provide more time for the vehicle to shift into park and thus stop, reducing a likelihood of injury to the exiting occupant. The second type of conventional automatic-park feature is slower than detecting that the driver door opened.

DETAILED DESCRIPTION

Figure 1:
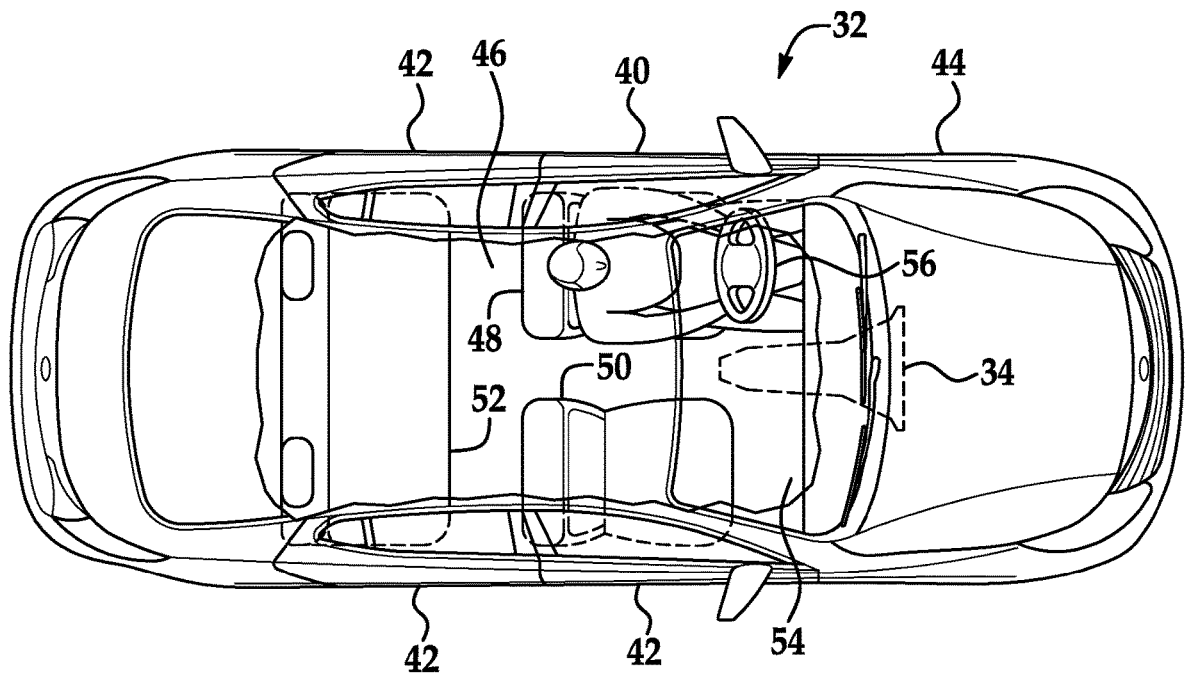
FIG. 1 is a top view of an example vehicle with a passenger cabin exposed for illustration.

The sensor arrangement and computer programming described below may detect that an occupant is in the process of exiting the vehicle before the occupant rises from a seat; thus, the present system may be able to shift a transmission into park before the second type of a conventional automatic-park feature would have shifted the transmission into park. The earlier shift to park provides more stopping time for the vehicle and thus may reduce a likelihood of injury to the occupant. Moreover, the present system provides similar functionality as the second type of conventional automatic-park feature even if the vehicle lacks doors or has removable doors. The present system may also provide the benefits of the second type of conventional automatic-park feature even if the driver can exit the vehicle through doors other than the driver door, such as in delivery trucks.

A computer includes a processor and a memory storing processor-executable instructions. The processor is programmed to shift a vehicle transmission from a gear into park upon receiving a first signal from a first active sensor beyond a signal threshold and then, within a time threshold, receiving a second signal from a second active sensor beyond the signal threshold, and the signals are correlated with distances from the respective active sensor to a detected object.

The first and second active sensors may be arranged to detect legs of an occupant of 50th-percentile stature sitting in a driver seat of a vehicle including the vehicle transmission.

The first and second active sensors may be spaced from each other in a cross-vehicle direction in a vehicle including the vehicle transmission. The second active sensor may be outboard of the first active sensor.

The first and second active sensors may be arranged on a seat bottom in a vehicle including the vehicle transmission.

The first and second active sensors may be arranged on an instrument panel below a steering wheel in a vehicle including the vehicle transmission.

A method includes shifting a vehicle transmission from a gear into park upon receiving a first signal from a first active sensor beyond a signal threshold and then, within a time threshold, receiving a second signal from a second active sensor beyond the signal threshold, and the signals are correlated with distances from the respective active sensor to an object.

The first and second active sensors may be arranged to detect legs of an occupant of 50th-percentile stature sitting in a driver seat of a vehicle including the vehicle transmission.

The first and second active sensors may be spaced from each other in a cross-vehicle direction in a vehicle including the vehicle transmission. The second active sensor may be outboard of the first active sensor.

The first and second active sensors may be arranged on a seat bottom in a vehicle including the vehicle transmission.

The first and second active sensors may be arranged on an instrument panel below a steering wheel in a vehicle including the vehicle transmission.

A vehicle includes a first active sensor, a second active sensor fixed relative to the first active sensor, a transmission, and a computer in communication with the first and second active sensors and the transmission. The computer is programmed to shift the transmission from a gear into park upon receiving a first signal from the first active sensor beyond a signal threshold and then, within a time threshold, receiving a second signal from the second active sensor beyond the signal threshold, and the signals are correlated with distances from the respective active sensor to a detected object.

The vehicle may further include a driver seat, and the first and second active sensors may be arranged to detect legs of an occupant of 50th-percentile stature sitting in the driver seat.

The first and second active sensors may be spaced from each other in a cross-vehicle direction. The second active sensor may be outboard of the first active sensor.

The vehicle may further include a driver seat including a seat bottom, and the first and second active sensors may be arranged on the seat bottom and aimed in a vehicle-forward direction.

The vehicle may further include an instrument panel and a steering wheel attached to the instrument panel, and the first and second active sensors may be arranged on the instrument panel below the steering wheel and aimed in a vehicle-rearward direction.

The vehicle may further include a body and a door removably attached to the body.

With reference to the Figures, a computer 30 in a vehicle 32 includes a processor and a memory storing processor-executable instructions. The processor is programmed to shift a transmission 34 of the vehicle 32 from a gear into park upon receiving a first signal 505 from a first active sensor 36 beyond a signal threshold and then, within a time threshold, receiving a second signal 510 from a second active sensor 38 beyond the signal threshold. (The adjectives "first" and "second" are used throughout this document as identifiers and are not intended to signify importance or order.) The signals 505, 510 are correlated with a distance from the respective active sensor 36, 38 to a detected object.

With reference to FIG. 1, the vehicle 32 includes a body 44. The vehicle 32 may be of a unibody construction, in which a frame and a body 44 of the vehicle 32 are a single component. The vehicle 32 may, alternatively, be of a body-on-frame construction, in which the frame supports a body 44 that is a separate component from the frame. The frame and body 44 may be formed of any suitable material, for example, steel, aluminum, etc.

The vehicle 32 includes doors 40, 42 rotatably attached to the body 44. At least some of the doors 40, 42, including a driver door 40, may be removably attached to the body 44. For the purposes of this disclosure, "removably attached" is defined as detachable in a manner using only nonspecialty tools, i.e., tools marketed to consumers rather than automotive repair specialists, and in a manner allowing for reattachment. The driver door 40 is used by a human driver of the vehicle 32 to enter and exit the vehicle 32.

The vehicle 32 includes the transmission 34 as part of a propulsion system. The propulsion system may be a known vehicle propulsion subsystem, for example, a conventional powertrain including an internal-combustion engine coupled to the transmission 34 that transfers rotational motion to wheels; an electric powertrain including batteries, an electric motor, and the transmission 34 that transfers rotational motion to the wheels; a hybrid powertrain including elements of the conventional powertrain and the electric powertrain; or any other type of propulsion. The transmission 34 transmits the kinetic energy from the electric motor and/or the internal-combustion engine to a drive axle and ultimately to wheels of the vehicle 32, while applying a gear ratio allowing different tradeoffs between torque and rotational speed. The gear ratios, i.e., gears, include reverse, park (i.e., locking the wheels from moving), neutral, first gear, second gear, third gear, etc.

The vehicle 32 includes a passenger cabin 46 to house occupants, if any, of the vehicle 32. The passenger cabin 46 includes seats 48, 50, 52, such as a driver seat 48 and a passenger seat 50 disposed at a front of the passenger cabin 46 and one or more back seats 52 disposed behind the driver and passenger seats 48, 50. The passenger cabin 46 may also include third-row seats (not shown) at a rear of the passenger cabin 46. In FIG. 1, the driver and passenger seats 48, 50 are shown to be bucket seats, and the back seats 52 are shown to be bench seats, but the seats 48, 50, 52 may be other types than as shown. The position and orientation of the seats 48, 50, 52 and components thereof may be adjustable by an occupant.

An instrument panel 54 may be disposed at a forward end of the passenger cabin 46 and face toward the driver and passenger seats 48, 50. The instrument panel 54 may include vehicle controls, such as a steering wheel 56; gauges, dials, and information displays; heating and ventilation equipment; a radio and other electronics; etc. The steering wheel 56 may be rotatably attached to the instrument panel 54.

Figure 2:
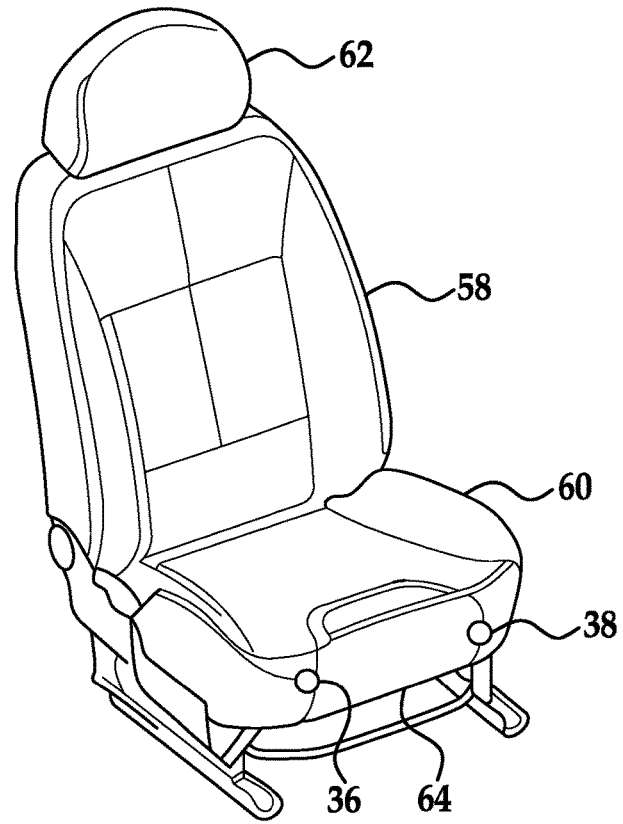
FIG. 2 is an example seat of the vehicle of FIG. 1 with active sensors.

With reference to FIG. 2, each of the seats 48, 50, 52 may include a seat back 58, a seat bottom 60, and a headrest 62. The headrest 62 may be supported by the seat back 58 and may be stationary or movable relative to the seat back 58. The seat back 58 may be supported by the seat bottom 60 and may be stationary or movable relative to the seat bottom 60. The seat back 58, the seat bottom 60, and/or the headrest 62 may be adjustable in multiple degrees of freedom. Specifically, the seat back 58, the seat bottom 60, and/or the headrest 62 may themselves be adjustable, in other words, adjustable components within the seat back 58, the seat bottom 60, and/or the headrest 62, and/or may be adjustable relative to each other.

Figure 3:
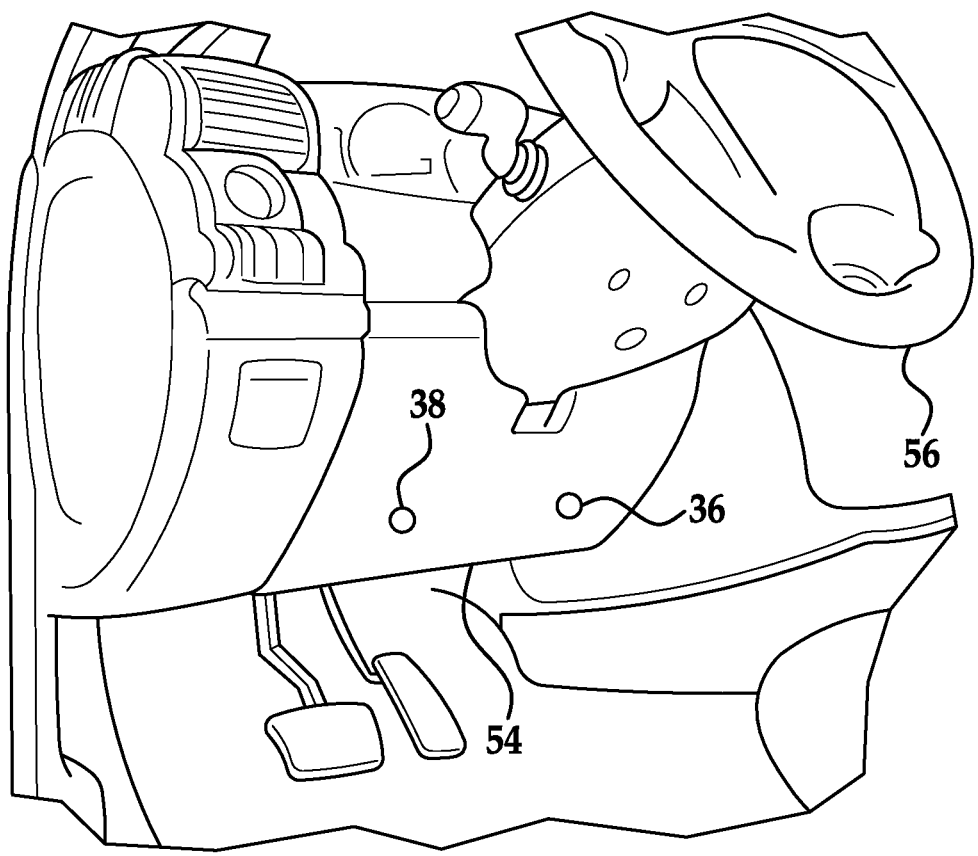
FIG. 3 is an example instrument panel of the vehicle of FIG. 1 with active sensors.

With reference to FIGS. 2 and 3, the first and second active sensors 36, 38 produce the respective first and second signals 505, 510. For the purposes of this disclosure, "active sensor" is defined as a sensor that transmits energy, e.g., electromagnetic waves or sound waves, to the environment and detects the energy reflected back by the environment. The active sensors 36, 38 can be any sensor suitable for detecting reflected energy from an object within a range of at least a few feet, e.g., within three feet. For example, the active sensors 36, 38 may be infrared sensors, ultrasound sensors, radar sensors, or LIDAR sensors. The active sensors 36, 38 may transmit an energy pulse and measure an intensity of the same type of energy. For example, if the active sensors 36, 38 are infrared sensors, the active sensors 36, 38 may transmit infrared radiation with a field of view and measure an intensity infrared radiation received from the environment. The intensity of, e.g., infrared energy is correlated with distance from the active sensor 36, 38 because a closer object reflects more of the transmitted infrared radiation back to the active sensor 36, 38, with less of the infrared radiation scattered elsewhere. The intensity may also be correlated with an angle of the object relative to the active sensor 36, 38, a reflectivity of the object, and an ambient temperature. For the purposes of this disclosure, "A is correlated with B" means that A either increases or decreases (but does not stay constant) as B increases, when other factors affecting A are held constant. For example, intensity may decrease as distance increases, assuming that angle of the detected object, reflectivity of the detected object, and ambient temperature stay the same; e.g., the intensity may follow the formula y=A log(B/x), in which y is intensity, x is distance, and A and B are constants determined empirically. Additionally or alternatively, the active sensor 36, 38 may measure a time-of-flight of an energy pulse to reach an object and return, which correlates with distance; e.g., t=x/V, in which t is time-of-flight, x is distance, and V is a constant velocity of the energy through a medium. In other words, a longer time-of-flight of the pulse indicates that a detected object is farther away from the active sensor 36, 38. The time-of-flight for a given distance may vary somewhat (i.e., V may vary somewhat) based on environmental factors such as temperature and humidity.

The first and second active sensors 36, 38 are arranged to detect legs of an occupant sitting in the driver seat 48, e.g., of an occupant of 50th-percentile stature sitting in the driver seat 48. The first and second active sensors 36, 38 are spaced from each other in a cross-vehicle direction; for example, the first and second active sensors 36, 38 may be spaced approximately an average distance between lower legs of an occupant sitting in the driver seat 48, i.e., each of the active sensors 36, 38 positioned at a cross-vehicle position matching an expected cross-vehicle position of the lower legs of the occupant. Data on the average distance between the lower legs of an occupant sitting in the driver seat 48 may be obtained with time-and-motion studies of occupants of varying sizes sitting in the driver seat 48. The active sensors 36, 38 may be fixed in place, and the second active sensor 38 may be fixed relative to the first active sensor 36. The second active sensor 38 may be outboard of the first active sensor 36, i.e., farther laterally from a centerline bisecting the vehicle 32. For example, if the driver seat 48 is located in a left half of the vehicle 32, as shown in FIG. 1, then the second active sensor 38 is left of the first active sensor 36, as shown in FIGS. 2 and 3.

For example, with reference to FIG. 2, the first and second active sensors 36, 38 may be arranged on the seat bottom 60 of the driver seat 48. The first and second sensors may be attached to the seat bottom 60 of the driver seat 48, e.g., to a forward surface 64 of the seat bottom 60. The first and second active sensors 36, 38 may be aimed in a vehicle-forward direction. For example, the first and second active sensors 36, 38 may be aimed at expected locations of calves, i.e., backs of the lower legs, of an occupant sitting in the driver seat 48, e.g., of an occupant of 50th-percentile stature sitting in the driver seat 48.

For another example, with reference to FIG. 3, the first and second active sensors 36, 38 may be arranged on the instrument panel 54 below the steering wheel 56. The first and second active sensors 36, 38 may be attached to the instrument panel 54. The first and second active sensors 36, 38 may be aimed in a vehicle-rearward direction. For example, the first and second active sensors 36, 38 may be aimed at expected locations of tibias, i.e., fronts of the lower legs, of an occupant sitting in the driver seat 48, e.g., of an occupant of 50th-percentile stature sitting in the driver seat 48.

Figure 4:
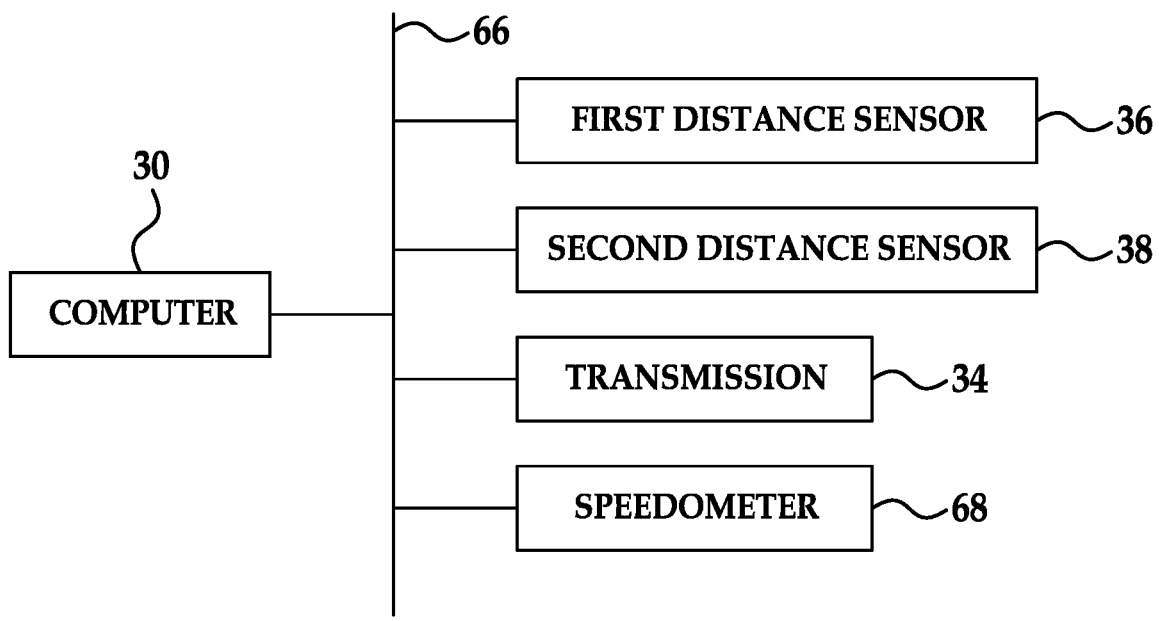
FIG. 4 is a block diagram of an example control system of the vehicle of FIG. 1.

With reference to FIG. 4, the computer 30 is a microprocessor-based controller. The computer 30 includes a processor, memory, etc. The memory of the computer 30 includes memory for storing instructions executable by the processor as well as for electronically storing data and/or databases.

The computer 30 may transmit and receive data through a communications network 66 such as a controller area network (CAN) bus, Ethernet, WiFi, Local Interconnect Network (LIN), onboard diagnostics connector (OBD-II), and/or by any other wired or wireless communications network. The computer 30 may be communicatively coupled to the first and second active sensors 36, 38, the transmission 34, a speedometer 68, and other components via the communications network 66.

The speedometer 68 may be any sensor suitable for measuring the speed of the vehicle, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the vehicle.

Figure 5:
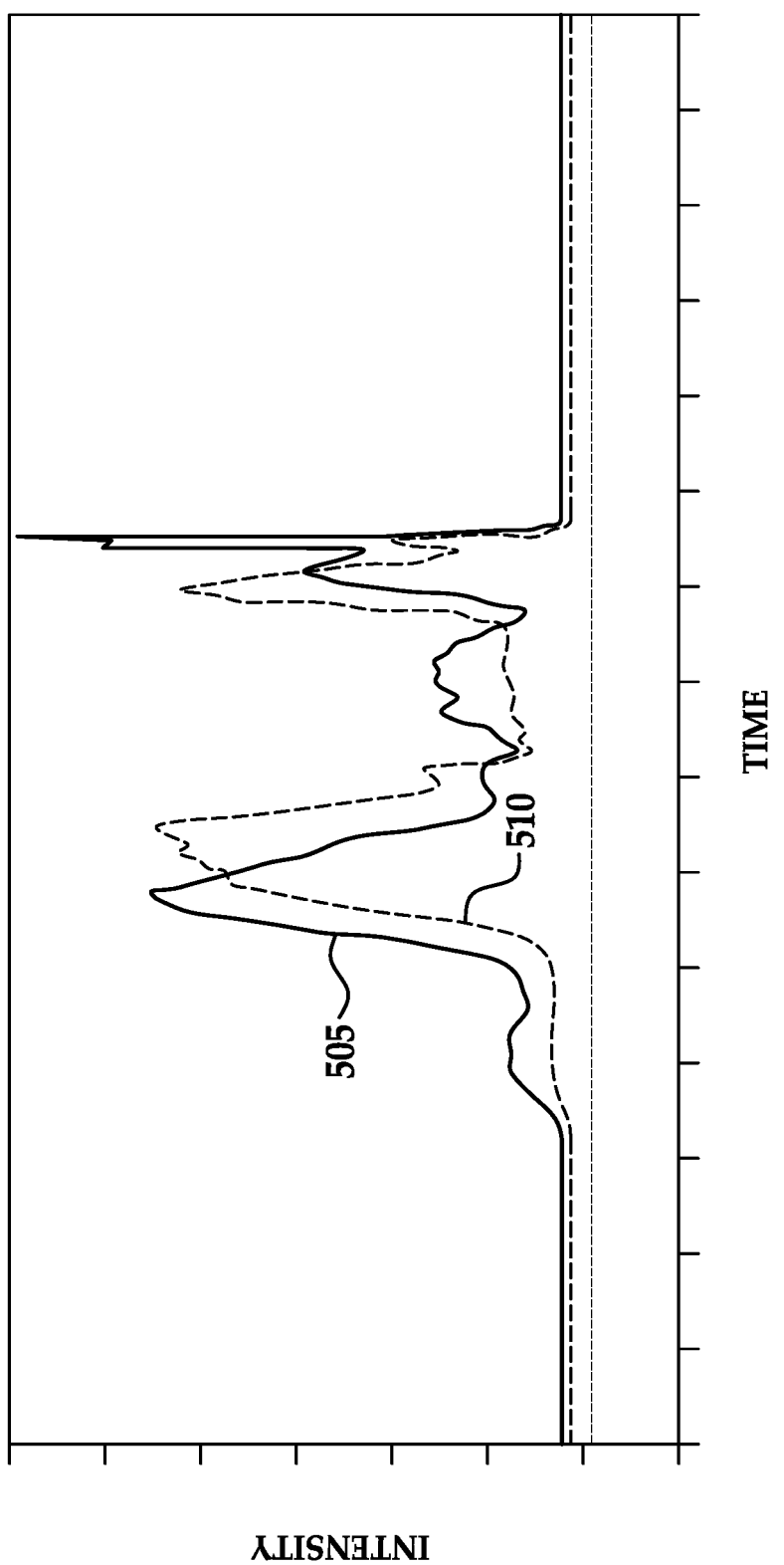
FIG. 5 is an example plot of the output of the active sensors of FIG. 2 or 3.

With reference to FIG. 5, the first and second active sensors 36, 38 are communicatively coupled to the computer 30 via the communications network 66 to transmit the respective first and second signals 505, 510 to the computer 30. FIG. 5 shows a plot of the first signal 505 and the second signal 510 over time. The abscissa, i.e., horizontal axis, represents time and may be measured in units of time, e.g., milliseconds. The ordinate, i.e., vertical axis, represents intensity and may be measured in units prescribed by a manufacturer of the active sensors 36, 38, e.g., counts, which may be inversely related to distance. Alternatively, the ordinate may represent another measure correlated with distance or may directly represent distance, measured in units of, e.g., inches. The first active sensor 36 may periodically send the first signal 505 to the computer 30, and the second active sensor 38 may periodically send the second signal 510 to the computer 30. The first and second signals 505, 510 may each be a sequence of scalar values, e.g., in counts or inches, sent at regular periods, e.g., every 0.0167 seconds, i.e., at 60 Hertz.

Figure 6:
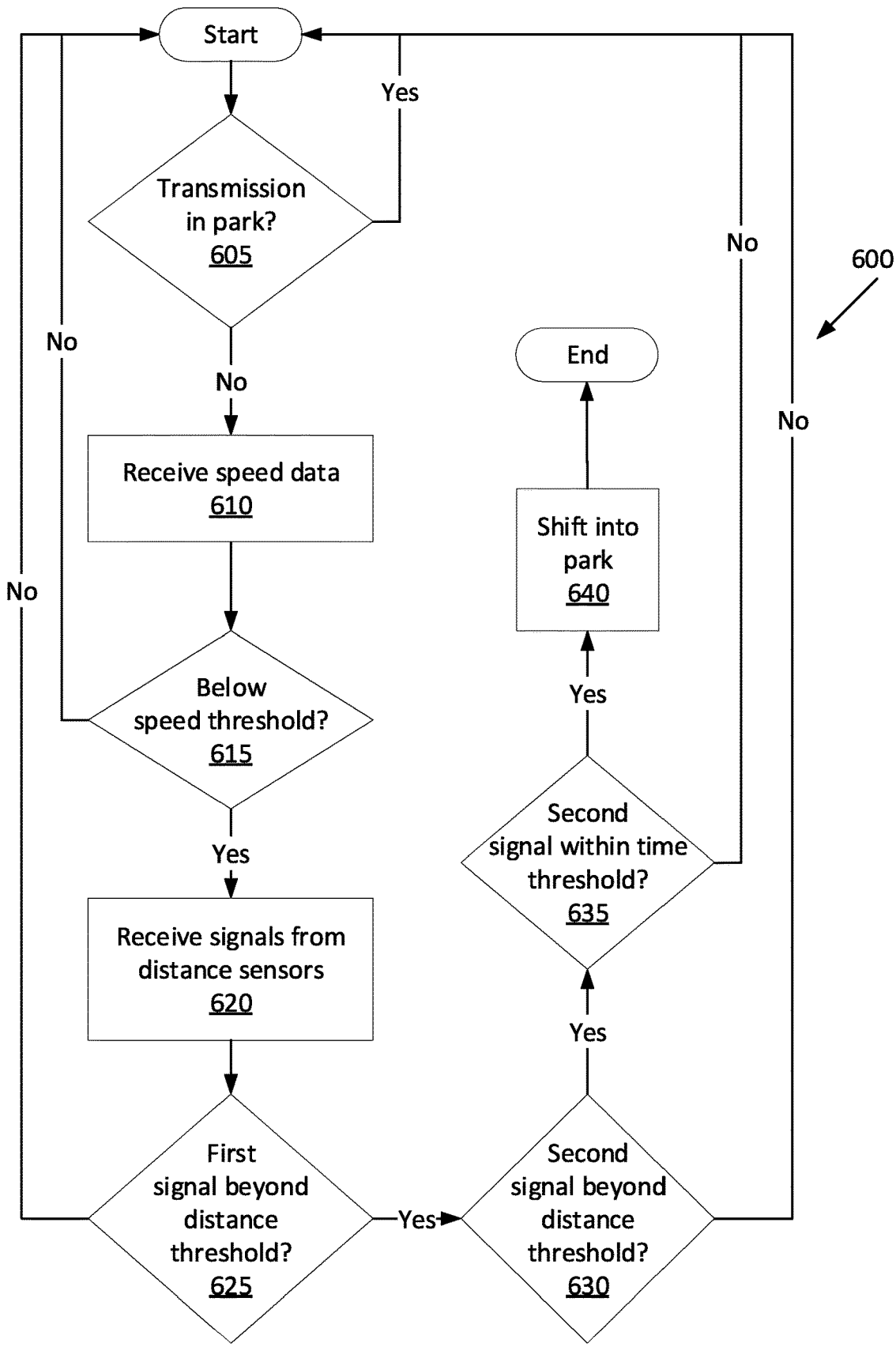
FIG. 6 is a process flow diagram of an example process for controlling a transmission of the vehicle of FIG. 1.

FIG. 6 is a process flow diagram of an exemplary process 600 for controlling the transmission 34 of the vehicle 32 based on a status of the occupant. The memory of the computer 30 stores executable instructions for performing the steps of the process 600. In general, the computer 30 shifts the transmission 34 into park upon determining that an occupant of the driver seat 48 is exiting the vehicle 32 based on the first and second signals 505, 510. The process 600 may be active at all times that the vehicle 32 is running, or the process 600 may only be active if the driver door 40 is removed from the vehicle 32.

The process 600 begins in a decision block 605, in which the computer 30 determines whether the transmission 34 is in park, i.e., whether the gear of the transmission 34 is park. The computer 30 may be in communication with the transmission 34 via conventional sensors, as are known. If the transmission 34 is in park, the process 600 restarts to continue monitoring.

If the transmission 34 is not in park, next, in a block 610, the computer 30 receives speed data from the speedometer 68. The speed data include a speed at which the vehicle 32 is currently traveling, measured in, e.g., miles per hour.

Next, in a decision block 615, the computer 30 determines whether the speed of the vehicle 32 is below a speed threshold. The speed threshold is a value stored in the memory of the computer 30 and measured in, e.g., the same units as the speed. The speed threshold may be chosen to be sufficiently low that the transmission 34 can shift to park without damage.

In a block 620, the computer 30 receives the signals 505, 510 from the active sensors 36, 38. The computer 30 may store the signals 505, 510 in short-term memory for a period at least as long as a time threshold (discussed below with respect to a decision block 635).

Next, in a decision block 625, the computer 30 determines whether the first signal 505 is beyond a signal threshold. The signal threshold, as well as whether the first signal 505 goes beyond the signal threshold by increasing above or decreasing below the signal threshold, is chosen based on the positions of the active sensors 36, 38 and on time-and-motion studies of occupants exiting the vehicle 32 from the driver seat 48. The test occupants for the time-and-motion studies may range in size, e.g., from 5th percentile in stature to 95th percentile in stature. When the occupant is sitting in the driver seat 48 to drive the vehicle 32, the occupant typically stretches their legs toward pedals, and when the occupant is exiting the vehicle 32, the occupant typically pulls their knees toward their torso so that their lower legs are oriented closer to vertical. The signal threshold may be chosen to be between the typical intensities measured when the occupant's lower legs when stretched out and when pulled up or between distances from the active sensors 36, 38 to the occupant's lower legs when stretched out and when pulled up, maximizing the proportion of occupants going beyond the signal threshold when and only when pulling their legs up and minimizing the proportion of occupants going beyond the threshold while their legs are stretched out (i.e., minimizing false positives). The choice of signal threshold may also take environmental variation of the intensity or time-of-flight into account. If the active sensors 36, 38 are attached to the seat bottom 60 of the driver seat 48, the signal threshold may be a maximum intensity or a minimum distance. For a maximum signal threshold, the first signal 505 may go beyond the signal threshold by increasing above the signal threshold, and for a minimum signal threshold, the first signal 505 may go beyond the signal threshold by decreasing below the signal threshold. If, alternatively, the active sensors 36, 38 are attached to the instrument panel 54 below the steering wheel 56, the signal threshold may be a minimum intensity or a maximum distance. The signal threshold may be represented in the same units as the first signal 505. If the first signal 505 has not gone beyond the signal threshold within the period stored in the memory of the computer 30, then the process 600 returns to the decision block 605 to continue monitoring.

If the first signal 505 has gone beyond the signal threshold within the stored period, next, in a decision block 630, the computer 30 determines whether the second signal 510 is beyond the signal threshold. Whether the second signal 510 goes beyond the signal threshold by increasing above or decreasing below the signal threshold is the same for the second signal 510 as for the first signal 505. If the second signal 510 has not gone beyond the signal threshold within the period stored in the memory of the computer 30, then the process 600 returns to the decision block 605 to continue monitoring.

If the second signal 510 has gone beyond the signal threshold within the stored period, next, in a decision block 635, the computer 30 determines whether the second signal 510 went beyond the signal threshold within the time threshold after the first signal 505 went beyond the signal threshold. The time threshold may be chosen based on time-and-motion studies of occupants exiting the vehicle 32 and driving the vehicle 32 without exiting. The time threshold may be chosen to maximize the proportion of occupants exceeding the signal threshold within the time threshold while exiting the vehicle 32 and to minimize the proportion of occupants exceeding the signal threshold within the time threshold while driving the vehicle 32. The time threshold may be measured in units of time, e.g., milliseconds. Detecting the second signal 510 going beyond the signal threshold after rather than before the first signal 505 may indicate that an occupant is exiting rather than entering the vehicle 32. If the second signal 510 did not go beyond the signal threshold within the time threshold after the first signal 505 went beyond the signal threshold, the process 600 returns to the decision block 605 to continue monitoring.

If the signals 505, 510 go beyond the signal threshold within the time threshold, next, in a block 640, the computer 30 shifts the transmission 34 from a gear into park. Thus, the vehicle 32 is locked from moving if the occupant of the driver seat 48 is apparently exiting the vehicle 32. After the block 640, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing processor-executable instructions, the processor programmed to:
   shift a vehicle transmission from a gear into park upon receiving a first signal from a first active sensor beyond a signal threshold and then, within a predetermined time threshold, receiving a second signal from a second active sensor beyond the signal threshold, wherein the first and second signals are both correlated with distances from the respective active sensor to a detected object;
   wherein the first and second active sensors are arranged to detect lower legs of an occupant of 50th-percentile stature sitting in a driver seat of a vehicle including the vehicle transmission; and
   the first and second active sensors are spaced from each other in a cross-vehicle direction in the vehicle.

2. The computer of claim 1, wherein the second active sensor is outboard of the first active sensor.

3. The computer of claim 2, wherein the processor is further programmed to not shift the vehicle transmission from the gear into park upon receiving the second signal beyond the signal threshold and then the first signal beyond the signal threshold, unless also receiving the first signal beyond the signal threshold and then, within the predetermined time threshold, receiving the second signal beyond the signal threshold.

4. The computer of claim 1, wherein the first and second active sensors are arranged on a seat bottom in a vehicle including the vehicle transmission.

5. The computer of claim 1, wherein the first and second active sensors are arranged on an instrument panel below a steering wheel in a vehicle including the vehicle transmission.

6. A method comprising:
   shifting a vehicle transmission from a gear into park upon receiving a first signal from a first active sensor beyond a signal threshold and then, within a predetermined time threshold, receiving a second signal from a second active sensor beyond the signal threshold, wherein the first and second signals are both correlated with distances from the respective active sensor to an object;
   wherein the first and second active sensors are arranged to detect lower legs of an occupant of 50th-percentile stature sitting in a driver seat of a vehicle including the vehicle transmission; and
   the first and second active sensors are spaced from each other in a cross-vehicle direction in the vehicle.

7. The method of claim 6, wherein the second active sensor is outboard of the first active sensor.

8. The method of claim 7, further comprising not shifting the vehicle transmission from the gear into park upon receiving the second signal beyond the signal threshold and then the first signal beyond the signal threshold, unless also receiving the first signal beyond the signal threshold and then, within the predetermined time threshold, receiving the second signal beyond the signal threshold.

9. The method of claim 6, wherein the first and second active sensors are arranged on a seat bottom of a driver seat in a vehicle including the vehicle transmission.

10. The method of claim 6, wherein the first and second active sensors are arranged on an instrument panel below a steering wheel in a vehicle including the vehicle transmission.

11. A vehicle comprising:
   a first active sensor;
   a second active sensor fixed relative to the first active sensor;
   a transmission;
   a driver seat; and
   a computer in communication with the first and second active sensors and the transmission, the computer programmed to shift the transmission from a gear into park upon receiving a first signal from the first active sensor beyond a signal threshold and then, within a predetermined time threshold, receiving a second signal from the second active sensor beyond the signal threshold, wherein the first and second signals are both correlated with distances from the respective active sensor to a detected object;
   wherein the first and second active sensors are arranged to detect lower legs of an occupant of 50th-percentile stature sitting in the driver seat; and the first and second active sensors are spaced from each other in a cross-vehicle direction in the vehicle.

12. The vehicle of claim 11, wherein the second active sensor is outboard of the first active sensor.

13. The vehicle of claim 12, wherein the computer is further programmed to not shift the vehicle transmission from the gear into park upon receiving the second signal beyond the signal threshold and then the first signal beyond the signal threshold, unless also receiving the first signal beyond the signal threshold and then, within the predetermined time threshold, receiving the second signal beyond the signal threshold.

14. The vehicle of claim 11, further comprising a driver seat including a seat bottom, wherein the first and second active sensors are arranged on the seat bottom and aimed in a vehicle-forward direction.

15. The vehicle of claim 11, further comprising an instrument panel and a steering wheel attached to the instrument panel, wherein the first and second active sensors are arranged on the instrument panel below the steering wheel and aimed in a vehicle-rearward direction.

16. The vehicle of claim 11, further comprising a body and a door removably attached to the body.

\* \* \* \* \*